June 10, 1952 — G. KRAMER — 2,599,845
SELF-CLEANING POWER-DRIVEN CYLINDER HARROW
Filed July 6, 1949
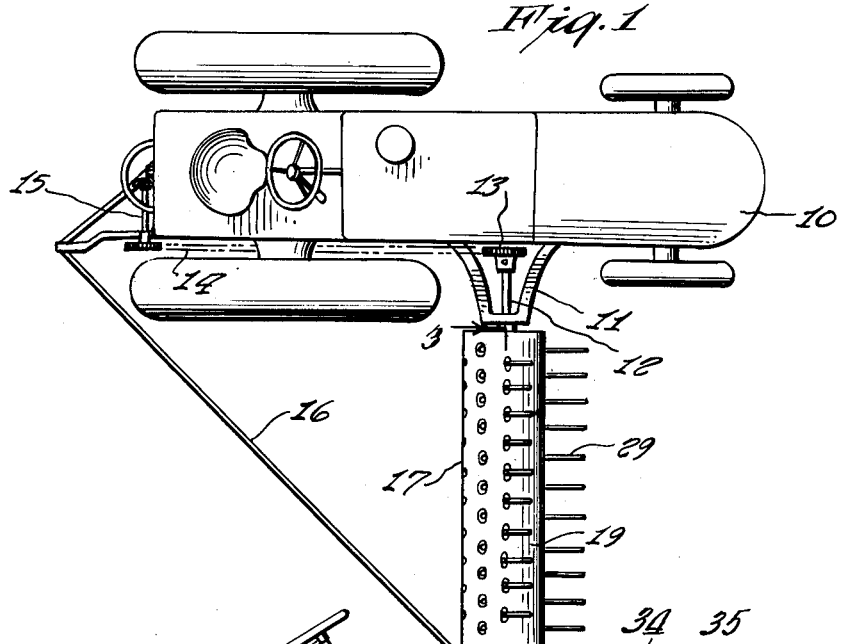
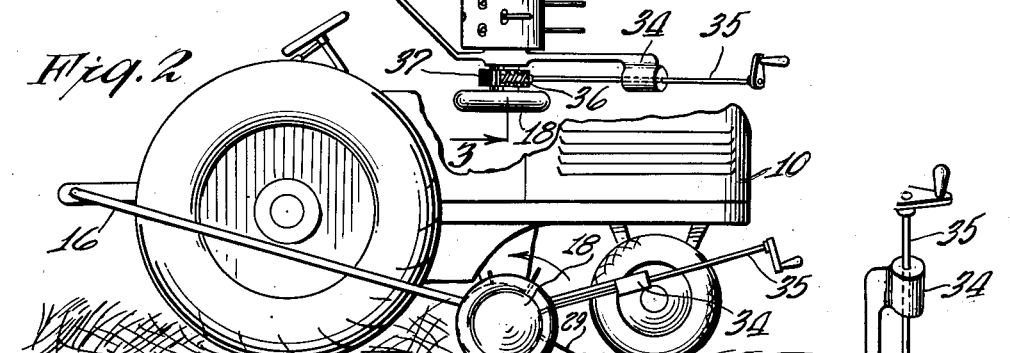
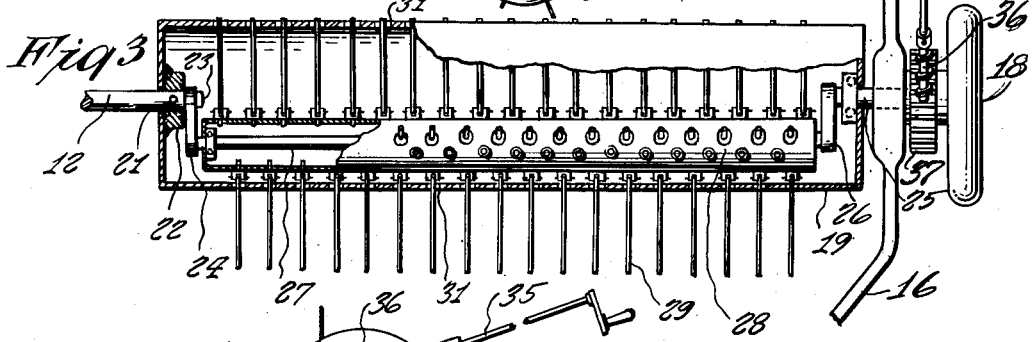
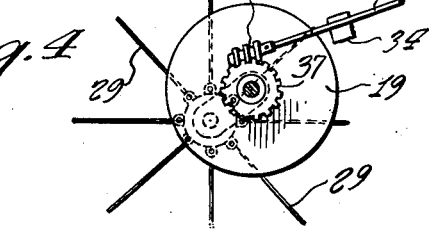
INVENTOR.
GEORGE KRAMER
BY Carl Miller
ATTORNEY Patented June 10, 1952

2,599,845

UNITED STATES PATENT OFFICE 2,599,845

SELF-CLEANING POWER-DRIVEN CYLINDER HARROW

George Kramer, Springfield, Oreg.

Application July 6, 1949, Serial No. 103,220

1 Claim. (Cl. 97—40)

This invention relates to a self-cleaning power driven cylinder harrow.

It is an object of the present invention to provide a side mounted self-cleaning power driven cylinder harrow for tractors whereby the harrow can be used at a location where the operator of the tractor has clear vision of the same and wherein harrowing can be effected close to trees or fences without the tractor becoming entangled with the trees or fence and of a type wherein the operating teeth are kept free and clean at all times and does not clog.

Other objects of the present invention are to provide a self-cleaning power driven cylinder harrow adapted for connection to the side of a tractor, which is of simple construction, inexpensive to manufacture, easy to attach to the harrow, easily controlled for the depth of operation, has a minimum number of parts, compact and efficient in operation.

For other objects and for a better understanding of the invention, reference may be had to the following detailed description taken in connection with the accompanying drawing, in which Fig. 1 is a top plan view of a tractor with the self-cleaning power driven cylinder harrow of the present invention connected thereto.

Fig. 2 is a side elevational view of the tractor and of the harrow.

Fig. 3 is a transverse sectional view of the harrow.

Fig. 4 is an end elevational view of the harrow looking upon the depth control wheel.

Referring now to the figures, 10 represents a tractor having a side bracket 11 in which is journalled a shaft 12. This shaft has a gear 13 thereon which is connected to a sprocket chain 14 to a power takeoff device 15 at the rear of the tractor. An arm 16 extends from the rear of the tractor and is connected to the outer end of the harrow, indicated generally at 17. This harrow has a ground supporting wheel 18 located at the outer end of the arm 16. The harrow comprises an outer cylinder 19 which is fixed by a pin 21 extending through an internal ring projection 22 thereof and to said shaft 12, Fig. 3, whereby the cylinder 19 will be driven by the shaft 12.

In the end of shaft 12 is a bolt 23 serving to loosely connect arm 24 to the shaft. The outer end of the cylinder 19 has a stub shaft 25 connected to it to which arm 26 is rigidly secured. Between the arms 24 and 26 is a shaft 27 on which a spike cylinder 28 is rotatably connected. Hinged to the cylinder 28 are a plurality of spikes 29 which extend through openings 31 in the outer cylinder 19. These spikes, as the outer cylinder is rotated, will move through the openings whereby the spikes will be cleaned of any weeds or the like picked up by them. The arm 16 may carry a bracket 34 a fragment of which is shown in Fig. 4, in which is journalled a shaft 35 having a worm 36 connected with a large gear 37 to effect, as the shaft 35 is turned, the adjustment of the spike cylinder 28 within the outer cylinder 19. By swinging the arm 26 in the spike cylinder upwardly or downwardly within the outer cylinder 19, different operating depths of the spike teeth 29 is effected.

While various changes may be made in the detail construction, it shall be understood that such changes shall be within the spirit and scope of the present invention as defined by the appended claim.

Having thus set forth and disclosed the nature of my invention, what is claimed is:

In combination, a tractor having a first bracket, a shaft journalled in said bracket, a main cylinder fixed to the shaft and adapted to be driven by the same, power take-off means connected to the shaft to drive the same, an arm adjustable upon the end of the shaft lying within the main cylinder, a stub shaft secured to the opposite end of said cylinder and having an arm fixed thereto, spike cylinder means rotatably connected between the arms and having spikes hinged to the said spike cylinder and extending therefrom, said main cylinder having openings for receiving said spikes and through which they may slide and may assume different angular positions, a ground supporting wheel journalled on the stub shaft and an arm extending from the tractor to the stub shaft supporting the latter, means for adjustably setting the spike cylinder within the outer cylinder comprising a gear keyed to the said stub shaft, a second bracket on the stub shaft supported by the said arm, an adjustment shaft journalled in said bracket and having a worm engageable with said gear, and a crank on said adjustment shaft to effect the adjustment of the spike cylinder in the main cylinder.

GEORGE KRAMER.

REFERENCES CITED

The following references are of record in the file of this patent:

UNITED STATES PATENTS

| Number | Name | Date |
|---|---|---|
| 1,912,706 | Goodman | June 6, 1933 |

FOREIGN PATENTS

| Number | Country | Date |
|---|---|---|
| 292,181 | Germany | May 29, 1916 |